United States Patent [19]

Mouret

[11] Patent Number: 4,885,990

[45] Date of Patent: Dec. 12, 1989

[54] CONTROL OF TWINE GUIDE ARM IN A PICKUP BALER

[75] Inventor: Patrick Mouret, Mardie, France

[73] Assignee: Rivierre Casalis, Fleury-Les-Aubrais, France

[21] Appl. No.: 106,261

[22] Filed: Oct. 9, 1987

[30] Foreign Application Priority Data

Oct. 10, 1986 [FR] France .................. 86 14107

[51] Int. Cl.$^4$ .......................................... B65B 13/18
[52] U.S. Cl. ........................................ 100/88; 100/5; 100/13
[58] Field of Search .............. 100/5, 13, 88; 56/341, 56/343, 342

[56] References Cited

U.S. PATENT DOCUMENTS

| | | |
|---|---|---|
| 2,971,455 | 2/1961 | Wade et al. |
| 4,248,143 | 2/1981 | Gaeddert. |
| 4,282,804 | 8/1981 | Cools ................................. 100/5 |
| 4,505,197 | 3/1985 | Shenberger et al. |
| 4,530,279 | 7/1985 | Wallser .............................. 100/5 |
| 4,557,189 | 12/1985 | Schaible .......................... 100/5 X |
| 4,579,052 | 4/1986 | Schaible ............................ 100/5 |
| 4,649,812 | 3/1987 | Mouret . |

FOREIGN PATENT DOCUMENTS

| | | |
|---|---|---|
| 0041444 | 5/1981 | European Pat. Off. . |
| 0085817 | 2/1982 | European Pat. Off. . |
| 0090120 | 3/1982 | European Pat. Off. . |
| 0057122 | 8/1982 | European Pat. Off. . |
| 0159049 | 9/1982 | European Pat. Off. . |
| 0160295 | 9/1982 | European Pat. Off. . |
| 0137882 | 10/1983 | European Pat. Off. . |
| 0117817 | 2/1984 | European Pat. Off. . |
| 0157898 | 4/1984 | European Pat. Off. . |
| 0159093 | 4/1985 | European Pat. Off. . |
| 0192904 | 9/1986 | European Pat. Off. . |
| 3007646 | 9/1981 | Fed. Rep. of Germany . |
| 1552696 | 1/1969 | France . |
| 7812727 | 4/1978 | France . |
| 7929235 | 11/1979 | France . |
| 8303082 | 2/1983 | France . |
| 2541560 | 8/1984 | France . |
| 2018192 | 10/1979 | United Kingdom . |

Primary Examiner—Andrew M. Falik
Attorney, Agent, or Firm—Oblon, Spivak, McClelland, Maier & Neustadt

[57] ABSTRACT

A device for controlling at least one twine guide arm 23, 24 for tying cylindrical bales in a pickup baler. The twine guide arm 23, 24 is adapted to pivot under the action of a control cable 25 close to the bale resting on the driving roller 14, while a tension arm 18 acting on shaping belts 12, 13 rests on the bale. At the end of the bale forming process, the distance between the tension arm 18 and the driving roller controls elements 33, 38 for moving the guide arm or arms 23, 24 toward a starting position corresponding to the beginning of the tying. The portion of the twine which is wound around the bale is then caught during the rotation of the bale for constituting the control parameter for controlling a cam engaging mechanism 40 adapted to engage the guide arm actuating elements 33, 38 during the tying process.

3 Claims, 3 Drawing Sheets

CONTROL OF TWINE GUIDE ARM IN A PICKUP BALER

BACKGROUND OF THE INVENTION

1. Field of the Invention

This invention relates to a process and a device for controlling at least one twine guide arm in a pickup baler for wrapping cylindrical bales.

Such a baler, as described in publication FR-A-2 541 560 provides for picking up of windrows and rolling them into a spiral within an expandable baling chamber until the bale completely fills the same.

The bale is then surrounded by a twine helically wound around the bale and then ejected from the baler.

The wrapping or tying of the bale requires sustained attention on the part of the baler driver. On the one hand, the twine guide arm must be correctly placed at the beginning of the tying process and, on the other hand, the movement of the arm must be slow enough for winding the twine around the bale a number of times sufficient to render the bale compact.

2. Description of Related Art

French publication FR-A-2 442 577 describes a baler in which the guide arm is pivoted by means of a traction cable operated by the driver.

Tying devices are also known in which the guide arm is moved in a back and forth movement by a motorized control device, manual intervention possibly being necessary to adjust the speed of the motor or to stop it.

To overcome this drawback, French publication FR-A-2 414 295 provides means for controlling the movement of the guide arm by the bale itself when the latter has reached a predetermined size. For this purpose, the bale actuates a device for actuating a gear motor provided for controlling the tying device.

U.S. patent specification No. 4 649 812 discloses a hay baler of the kind considered herein, which is provided with a twine guide control mechanism having a control cam. Said cam by the action of which the wrapping or tying process is controlled is rotated stepwise by a motor-driven crank that permanently cooperates with a gear integral with said cam.

The present invention is aimed, i.a., at providing a structure wherein the cam can be conveniently engaged or disengaged kinetically with respect to the remainder of the tying control mechanism under the control of means for measuring the diameter of the bale being formed.

The object of such arrangement is to provide control of at least one twine guide arm in such a manner that a bale is tied automatically when, in the course of its formation in the baler, it has reached a predetermined diameter.

SUMMARY OF THE INVENTION

The invention is based on the idea of actuating at the least one twine guide arm by measuring the diameter of the bale supported by rollers which rotate said bale on which rests a tension arm associated with bale shaping belts.

According to the invention, at the end of the baling process, the distance between the tension arm and a bale driving roller constitutes the control parameter of cam actuating means adapted to displace a guide arm in a starting position for starting the tying process, where the rotating bale catches the twine whose part wound around the bale constitutes the control parameter for controlling said guide arm actuating means during tying.

The process thus defined is carried out by means of a mechanical control device, the movement and power of which are supplied by the bale supporting and driving rollers.

Other features and advantages of the invention will become apparent from the following description of an embodiment thereof which is given with reference to the accompanying drawings.

DESCRIPTION OF THE PREFERRED EMBODIMENT

Figure 1:
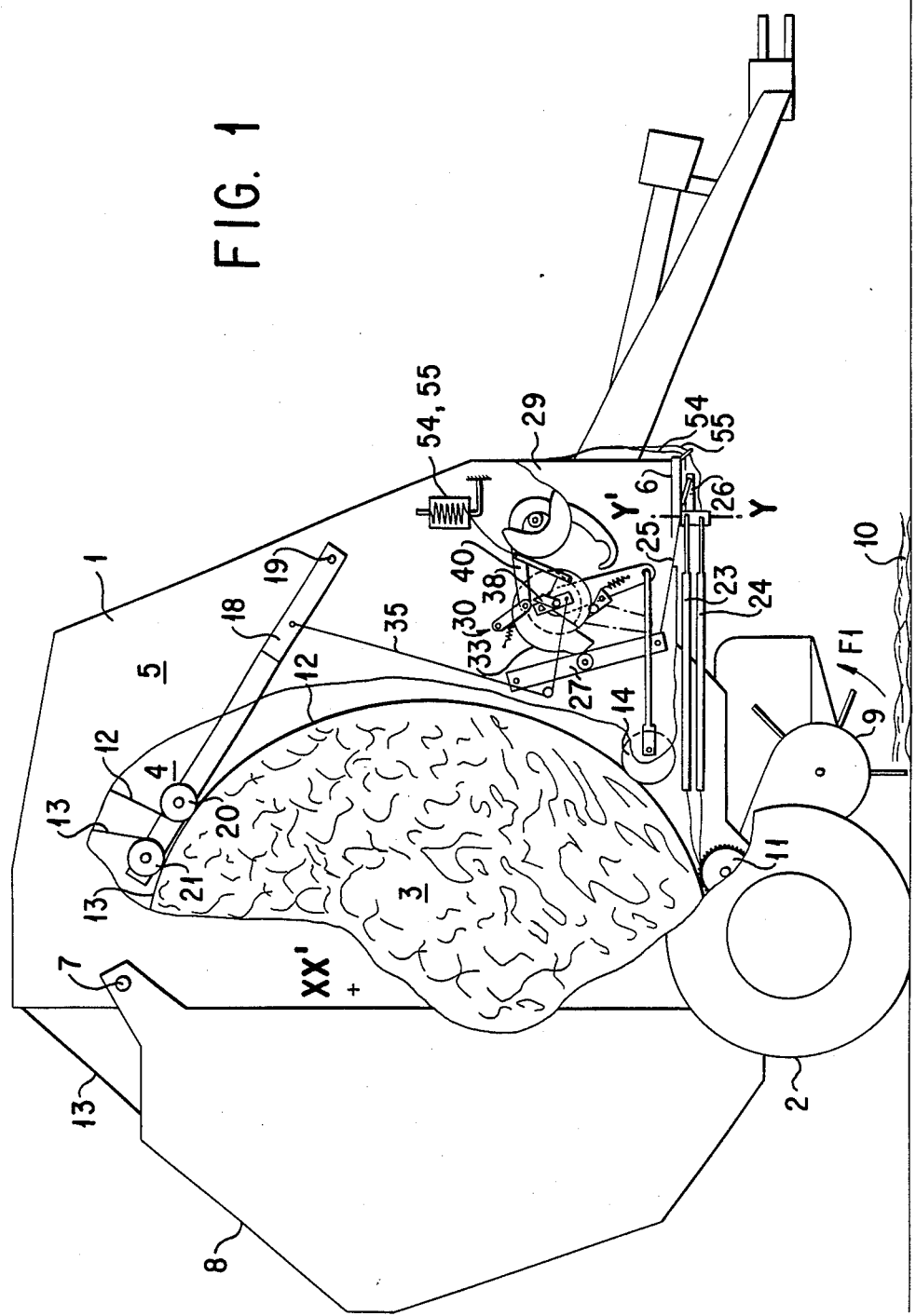
FIG. 1 is a side view of the baler from which a part of the side wall has been removed to show the bale in the process of completion and the installation of the twine guide arm controlling device.

Referring more particularly to FIG. 1, the hay baler shown is a baler known in the art and more particularly a tractor-drawn machine such as is commonly used in agriculture. It can be illustrated by the publication FR-A-2 541 560 filed in the name of the applicant.

The baler comprises a frame 1 supported on the ground through wheels 2, a shaping or baling chamber 3 into which e.g. hay is introduced in the form of a layer and then wound around itself about a horizontal axis XX', as well as a tying control mechanism 30 mounted on a wall 5 of the baler. Other characteristic parts of the baler are disclosed in detail in publication FR-A-2 541 560.

Frame 1 essentially comprises two side walls 4, 5 which limit the crosswise extent of shaping chamber 3 and carry the support of tying mechanism 30.

At the back of the stationary frame a door 8 supporting return rollers of a set of belts is pivoted on a pin or axle 7 and its opening and closing can be controlled by jacks or equivalent means (not shown), and it ensures the discharge of the bale at the end of the shaping or winding and tying cycle thereof. The front part of the frame carries a toothed pickup element 9 rotating in the direction of arrow F1. During the forward movement of the baler, pickup element 9 picks up harvest windrows 10 and conveys them into machine after they have come into contact with a notched feed roller 11 rotating in the same direction.

Two sets of belts 12 and 13 supported by return rollers comprise in a manner known per se a plurality of parallel belts distributed over the width of the baler. The sets of the belts 12 and 13 are driven by driving rollers such as 14 driven by a belt or chain transmission from a transmission housing which receives the movement by a drive shaft connected to the power takeoff shaft of the tractor. Driving roller 14, the set of belts 12, the corresponding return rollers of this set and certain return rollers of the set of belts 13 are mounted on the stationary frame, while other return rollers of the set of belts 13 are carried by door 8.

A tension arm 18 pivotally mounted on a pin 19 carried by the stationary frame supports two rollers 20, 21 respectively resting on the of sets of belts 12, 13. Support rollers 20, 21 delimit a slot for passage of sets of belts 12, 13. The sides of the belts located between driving roller 14, support rollers 20, 21 and notched roller 11 partly delimit shaping chamber 3.

Figure 2:
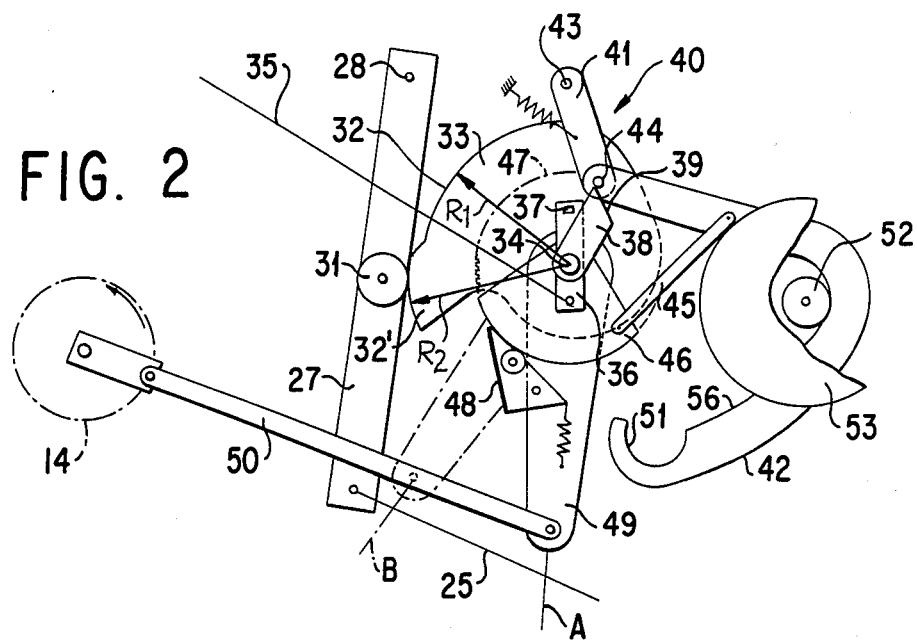
FIG. 2 is a side view of the device for controlling the twine guide arms during the process of shaping the bale.
Figure 3:
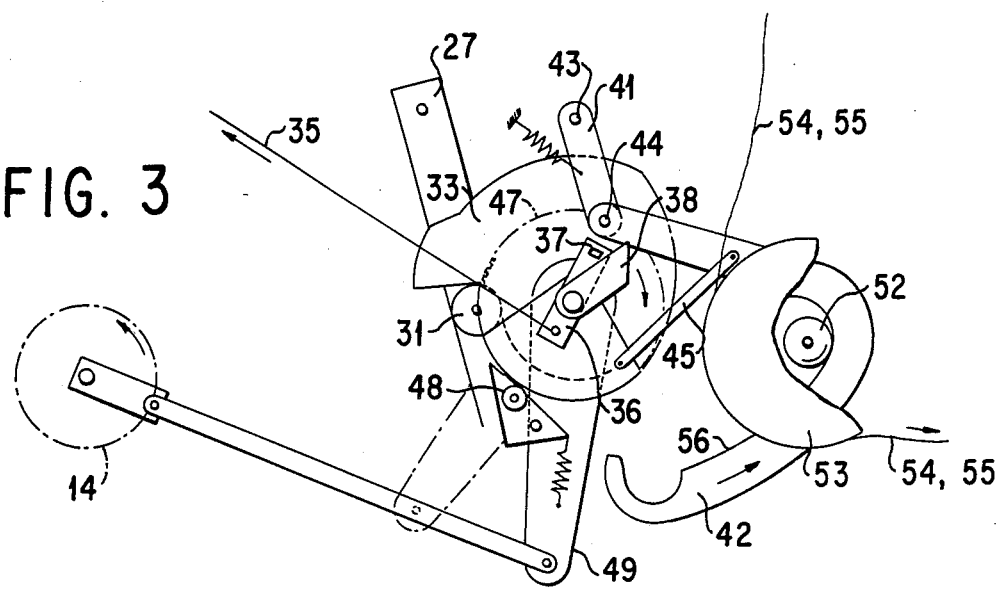
FIG. 3 is a side view of the device in the state it reaches when the bale is completed.
Figure 4:
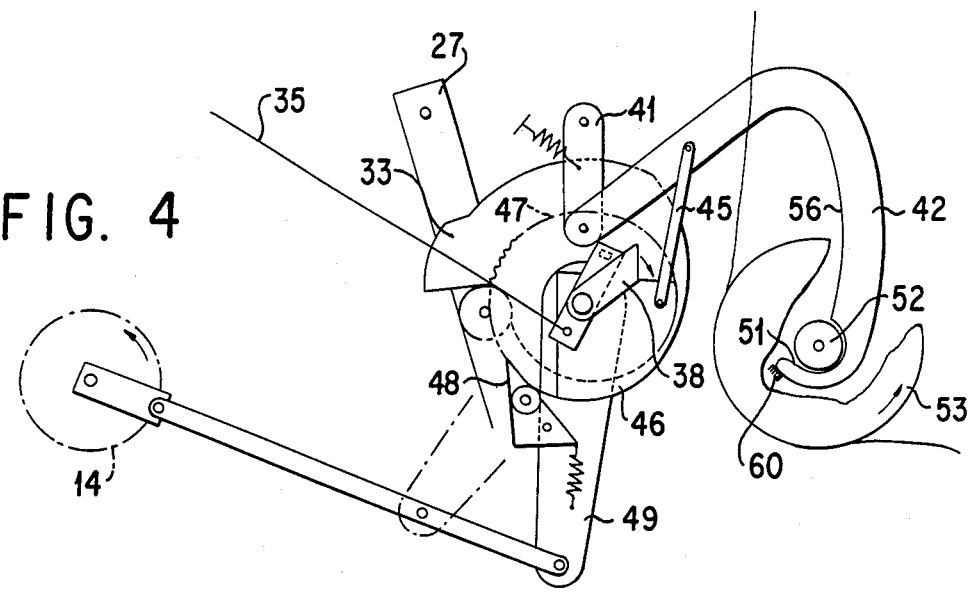
FIG. 4 is a side view of the device during the process of distribution of the twine around the bale.
Figure 5:
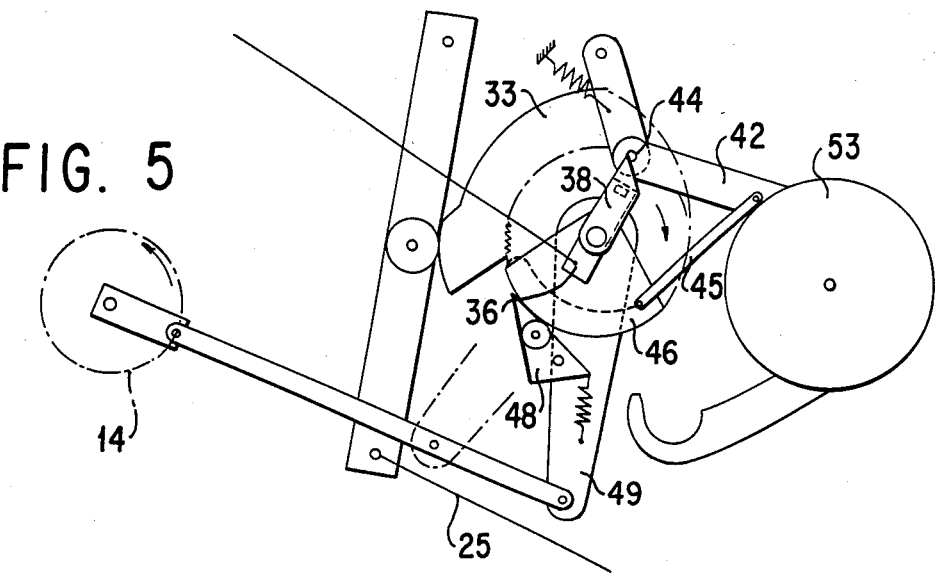
FIG. 5 represents the final position of the device after the distribution of the twine.

The tying device consists essentially of two guide arms 23, 24 which are in tubular form and are mounted to pivot around a YY' axis under the action of a control cable 25 to perform an alternating movement along the shaping chamber 3. For this purpose, arms 23, 24 are connected to a connecting or holding lever 26 which is pivoted about the YY' axis and the end of which is connected to cable 25. The other end of cable 25 is attached to the end of a control connecting rod 27 pivoted on a pin 28 carried by the wall of a housing 29 enclosing the control device of arms 23, 24. Moreover, the control connecting rod carries a driving roller 31 on which bears the profile 32 of an actuation cam 33. Cam 33 is mounted to rotate around a pin 34. Cam profile 32 has at least two radii of curvature R1, R2 (cf. FIG. 2) of which the smaller, R1, provides a position wherein roller 31 is immobilized and wherein consequently connecting rod 27 and arms 23, 24 are held in a fixed position. When the roller passes onto the larger radius of profile 32, said roller 31 and consequently connecting rod 27 and arms 23, 24 are mobile.

The steep change of the radius of curvature of profile 32 at the level of a protuberance 32' of the cam profile provides a modification of the position of roller 31 so that arms 23, 24 return to their initial position.

Figure 6:
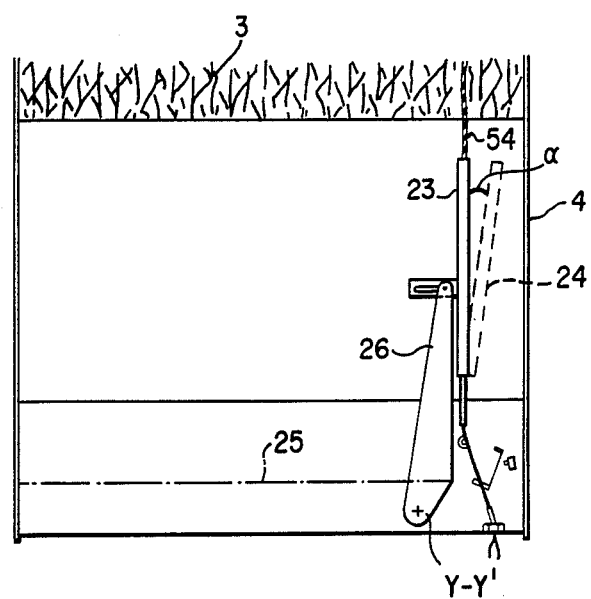
FIGS. 6 to 8, schematically show various positions of the twine guide arms during an operating cycle.
Figure 7:
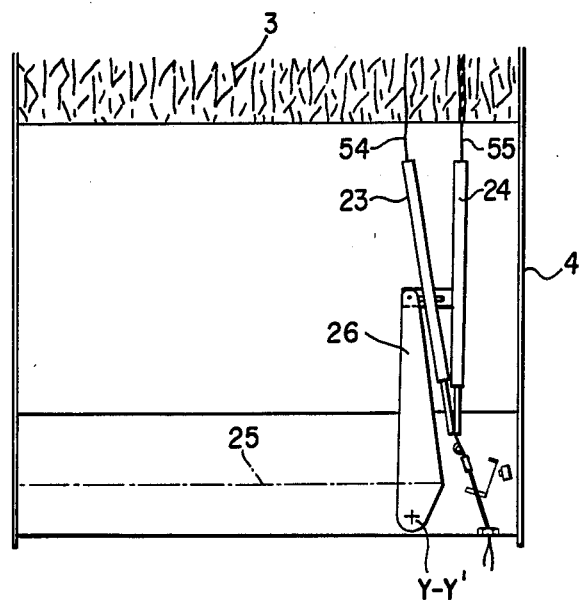
Figure 8:
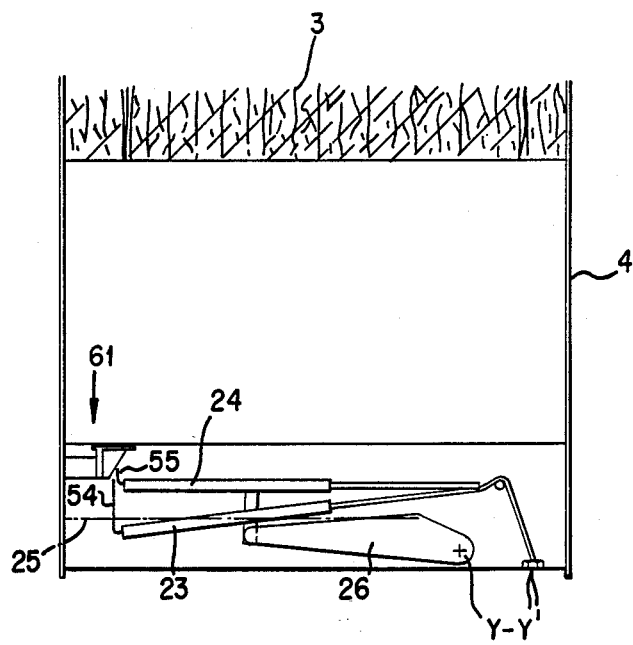

The cycle of the motion of guide arms 23, 24 as obtained by the varying relative position of cam follower or roller 31 are schematically shown in FIGS. 6 to 8.

FIG. 6 represents the starting or initial position of arms 23, 24, such as determined when cam following roller 31 rests on the R1 radius portion of cam profile 32. In this position connecting or holding lever 26 maintains arms 23, 24 at close proximity of one the side walls (referenced 4 in FIGS. 6 to 9) of the baler, said arms possibly being angularly offset with respect to each other by a small angle a.

FIG. 7 shows a first intermediate position of arms 23, 24 and associated lever 26, corresponding to a first phase of displacement of roller 31 on cam profile 32 while the latter passes from its radius R1 to its radius R2 portion at the location of its contact with roller 31.

FIG. 8 shows the final position of arms 23, 24 at the end of the cycle, corresponding to the moment when roller 31 reaches the radius R2 portion of cam profile 32. In this final position 23, 24 are substantially perpendicular to their starting position, twines 54, 55 have been wound about bale 3 over the entire axial length thereof and a severing mechanism schematically indicated at 61 is actuated in a manner known per se to sever the twines.

Thereafter roller 31 will leave the radius R2 portion of the rotating cam and engage again the radius R1 portion thereof, whereby arms 23, 24 and associated holding lever 26 are moved back into the initial or starting position schematized in FIG. 6 and the above-described cycle will start anew with a view to producing the following bale.

FIGS. 6 to 8 thus show the movement of guide arms 23, 24 which results when cam 33 is rotated. For this purpose, tension arm 18 is connected to a control cable 35 of a swing bar 36 mounted to rotate around pin 34. Swing bar 36 carries a retractable driving pin 37 able to drive a lever 38 for actuating cam 33.

The end of lever 38 is shaped as a ramp 39 for actuating a mechanism 40 forming part of the means for engaging cam 33 to obtain a rotation of the latter during the rotation of the completed bale, whereafter swing bar 36 remains at rest.

Mechanism 40 comprises a linkage consisting of a deformable assembly made up of levers 41, 42 one of which, 41, is pivoted around a pin 43 carried by housing 29 and the other of which, 42, has a bent shape. Levers 41, 42 are pivoted around the same pin 44 adapted to be moved radially under the action of connecting rod 45 for actuating a sector-shaped element 46 centered on cam 33 and which is mounted to rotate around pin 34.

Sector-shaped element 46 is also centered on a toothed coupling wheel 47 rotatively integral with the cam. Wheel 47 can be driven by a spring-loaded coupling pawl 48 pivoted on an arm 49 freely rotating around pin 34 of the cam. The back and forth movement of arm 49 between a position A shown in solid lines in FIG. 2 and a position B shown in dot-and-dash lines is controlled by a connecting rod and crank system 50 connected to the axis or pin of roller 14.

Moreover, bent lever 42 carries a stop 51 adapted to receive a roller 52 rotatively integral with a return pulley 53 of twines 54, 55 guided respectively by arms 23, 24. Roller 52 is in positive contact with lever 42 and for this purpose has teeth in contact with a rack zone 56 provided on the inner surface of the lever.

A stop 60 prevents the lever from engaging roller 52 during the rotation of cam 33.

The operating cycle of the device will be described below.

FORMATION OF THE BALE

(FIG. 2)

Connecting rod and crank system 50, driven by driving roller 14, actuates arm 49 in an alternating movement around pin 34.

COMPLETION OF THE BALE

(FIG. 3)

Driving roller 14 still actuates arm 49. The distance between driving roller 14 and tension arm 18 is maximum.

At the end of travel, tension arm 18 stretches cable 35. The traction on cable 35 is converted into a rotational movement of swing bar 36. Pin 37 of swing arm 36 drives lever 38 and consequently the cam-plus-toothed wheel 33, 47 unit. Due to the rotation of projection 32' of profile 32, connecting rod 27 moves to the center of profile 32 (radius R1) and slackening of cable 25 provides the prepositioning of arms 23, 24 at one end of the shaping chamber.

Twines 54, 55 are wound around return pulley 53, and the rotation movement of the bale imparted by roller 14 provides traction on the twines and rotation of pulley 53. The rotation of pulley 53 provides the vertical movement of bent lever 42 by means of roller 52.

START OF TYING (FIG. 4)

Driving roller 14 moves arm 49 in alternating directions.

Lever 42 drives connecting rod 45 and sector-shaped element 46 around pin 34, roller 52 is stopped at stop 51 of lever 42, the latter being immobilized by engaging another stop 60.

Spring-loaded pawl 48 is engaged at each movement of arm 49 between position A and B.

Cam 33 moves step by step in accordance with the angular movement of toothed wheel 47.

Due to the modification of the radius of curvature of profile 32 between values R1 and R2, connecting rod 27 and consequently arms 23, 24 move along chamber 3.

END OF TYING (FIG. 5)

Cam 33 continues is rotation under the action of the alternating driving movement imparted by arm 49. Cam 33 drives lever 38 whose ramp in turn pushes pin 44. Lever 42 is shown in another position such as that represented in FIG. 2 and sector-shaped element 46, pivoted in the direction of the releasing of pawl 48, prevents the cam from being driven under the action of driving roller 14 and arm 49.

The bale continues to rotate until twines 54, 55 are cut or severed.

I claim:

1. A device for controlling at least one guide arm adapted to guide twine for tying a cylindrical bale in a pick up baler, said guide arm being adapted to pivot under the action of a control cable in the proximity of said bale which rests on at least one bale driving roller adapted to rotate the bale, while a tension arm associated with the bale forming belts rests on said bale, said device comprising: a pivotally mounted tension arm for tensioning bale shaping belts and adapted to rest on a cylindrical bale, a rotary cam the profile of which has a small-radius portion and a large-radius portion, a toothed wheel coaxial to and integral with said cam, a cam-driving pawl cooperating with said toothed wheel for stepwise rotating said cam, said pawl being pivotally mounted on a cam driving arm pivotally mounted about an axis coinciding with the common axis of the cam and the toothed wheel and adapted to be subjected to alternate motion through crank means kinetically connected by said arm to a bale driving roller, a swing bar rotatively mounted on said common axis and connected through a cable to said tension arm, said swing bar being adapted to rotate a rotary lever about said common axis, said rotary lever having a ramp adapted to cooperate with a bent lever spring-biased toward a first position while being adapted to be moved by said ramp into a second position, said bent lever being connected by a connecting rod to a sector-shaped element pivotally mounted on said common axis and adapted to be placed between said pawl and said toothed wheel to prevent mutual engagement thereof when said bent lever is in said second position, said bent lever having a toothed portion adapted to mesh with a gear wheel when said bent lever is in said first position, said gear wheel being integral with and coaxial to a rotary twine guiding roller; and a cam follower cooperating with said cam profile and mounted on a control lever pivotally mounted at one of its ends on a fixed axis, while the opposite end of said control lever is connected through a cable to at least one movable twine guide to control the movements thereof.

2. A device according to claim 9, wherein said bent lever is pivotally mounted at one of its ends onto one end of an associated lever the opposite end of which is pivoted on a fixed axis.

3. A device according to claim 9, wherein said swing bar has a retractable driving pin for rotating said rotary lever.

* * * * *

UNITED STATES PATENT AND TRADEMARK OFFICE
CERTIFICATE OF CORRECTION

| | |
|---|---|
| PATENT NO. : | 4,885,990 |
| DATED : | Dec. 12, 1989 |
| INVENTOR(S) : | Patrick Mouret |

It is certified that error appears in the above-identified patent and that said Letters Patent is hereby corrected as shown below:

```
The total number of Drawing Sheets is incorrect,
should be:    --5--
```

Signed and Sealed this

Fourth Day of December, 1990

*Attest:*

HARRY F. MANBECK, JR.

*Attesting Officer*      *Commissioner of Patents and Trademarks*